US009331855B2

(12) United States Patent
Brown et al.

(10) Patent No.: US 9,331,855 B2
(45) Date of Patent: May 3, 2016

(54) APPARATUS, SYSTEM, AND METHOD FOR PROVIDING ATTRIBUTE IDENTITY CONTROL ASSOCIATED WITH A PROCESSOR

(75) Inventors: David A. Brown, San Jose, CA (US);
Adil Karrar, Santa Clara, CA (US);
Michael Neve de Mevergnies, Beaverton, OR (US); Sergiu D. Ghetie, Hillsboro, OR (US); Shahrokh Shahidzadeh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1033 days.

(21) Appl. No.: 13/174,940

(22) Filed: Jul. 1, 2011

(65) Prior Publication Data
US 2013/0002398 A1  Jan. 3, 2013

(51) Int. Cl.
G08C 17/02 (2006.01)
H04L 9/00 (2006.01)
H04L 9/32 (2006.01)
G06F 21/73 (2013.01)

(52) U.S. Cl.
CPC .............. *H04L 9/3234* (2013.01); *G06F 21/73* (2013.01); *H04L 2209/805* (2013.01)

(58) Field of Classification Search
CPC . G06F 21/575; G06F 21/73; H04L 2209/805; H04L 9/3234
USPC ............ 340/5.8, 1.1, 10.1–10.51; 726/27–29; 713/2, 171
See application file for complete search history.

(56) References Cited

U.S. PATENT DOCUMENTS

| | | | |
|---|---|---|---|
| 5,670,825 | A | 9/1997 | Hyde et al. |
| 5,946,713 | A | 8/1999 | Hacking et al. |
| 6,289,431 | B1 | 9/2001 | Bigbee et al. |
| 6,349,380 | B1 | 2/2002 | Shahidzadeh et al. |
| 6,462,554 | B2 | 10/2002 | Brown |
| 7,557,725 | B2 | 7/2009 | Shahidzadeh et al. |
| 7,633,168 | B2 | 12/2009 | Neve de Mevergnies et al. |
| 7,640,541 | B2 | 12/2009 | Shahidzadeh et al. |
| 7,656,184 | B2 | 2/2010 | Brown et al. |
| 7,698,507 | B2 | 4/2010 | Ghetie |
| 7,855,102 | B2 | 12/2010 | Neve de Mevergnies et al. |
| 8,365,983 | B2 | 2/2013 | Shahidzadeh et al. |
| 8,375,380 | B2 | 2/2013 | Shahidzadeh et al. |
| 8,522,322 | B2 | 8/2013 | Wishman et al. |
| 8,590,040 | B2 | 11/2013 | Ghetie et al. |
| 2002/0091872 | A1* | 7/2002 | Bourke-Dunphy et al. .. 709/316 |
| 2006/0026316 | A1* | 2/2006 | Milenkovic et al. ............ 710/62 |
| 2006/0091196 | A1* | 5/2006 | Durham et al. ................ 235/375 |
| 2007/0075139 | A1* | 4/2007 | Hammond et al. ........... 235/435 |

(Continued)

OTHER PUBLICATIONS

Pending U.S. Appl. No. 12/976,523, filed Dec. 22, 2010; Inventors: Ghetie et al.

*Primary Examiner* — Amine Benlagsir
*Assistant Examiner* — Sisay Yacob
(74) *Attorney, Agent, or Firm* — Blakely, Sokoloff, Taylor & Zafman LLP

(57) ABSTRACT

Described herein are an apparatus, system, and method for attribute identity control in a processor. The apparatus comprises a logic unit including a radio-frequency identification (RFID) tag comprising a non-volatile memory; and a processor operable to access the non-volatile memory, wherein the non-volatile memory for storing an attribute identity associated with a group of processors, the attribute identity being different from an identity of the processor.

15 Claims, 5 Drawing Sheets

(56) References Cited

U.S. PATENT DOCUMENTS

| | | | |
|---|---|---|---|
| 2008/0041930 A1* | 2/2008 | Smith et al. | 235/375 |
| 2009/0089885 A1* | 4/2009 | Noble et al. | 726/29 |
| 2010/0083365 A1* | 4/2010 | Gurumoorthy et al. | 726/16 |
| 2010/0109851 A1* | 5/2010 | Burbridge et al. | 340/10.42 |
| 2011/0121065 A1 | 5/2011 | Shahidzadeh et al. | |
| 2011/0233271 A1* | 9/2011 | Lin | 235/375 |
| 2013/0159579 A1 | 6/2013 | Neiger et al. | |
| 2013/0219191 A1 | 8/2013 | Wishman et al. | |

* cited by examiner

APPARATUS, SYSTEM, AND METHOD FOR PROVIDING ATTRIBUTE IDENTITY CONTROL ASSOCIATED WITH A PROCESSOR

FIELD OF THE INVENTION

Embodiments of the invention relate generally to the field of processors. More particularly, embodiments of the invention relate to an apparatus, system, and method providing attribute identity control associated with a processor.

BACKGROUND

Methods for compromising computer platforms, comprising a processor, are continually being developed. Currently, software vendors rely on unique identity (e.g., computer platform serial number, hard drive serial number, etc) to authenticate/validate a computer platform identity before enabling a software license for that specific computer platform. However, disclosing such unique identity (also called entity identity) to software executing on the processor enables profiling of personal user information associated with the user of the processor or computer platform. Examples of such personal user information include Original Equipment Manufacturer (OEM) information associated with the user processor or computer platform, processor configuration set by the manufacturer, end-user usage log for enabling targeted marketing, profiling consumer on-line traffic trends for targeted marketing, associating end users of the processor to a particular machine, and other forms of user profiling, etc.

Furthermore, protecting the unique identity on an integrated circuit (e.g., chipset) different from the processor (CPU), which is capable of communicating with the processor on a computer platform, does not preclude other agents (e.g., logic analyzers) to monitor and decode the communication between the integrated circuit and the processor.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
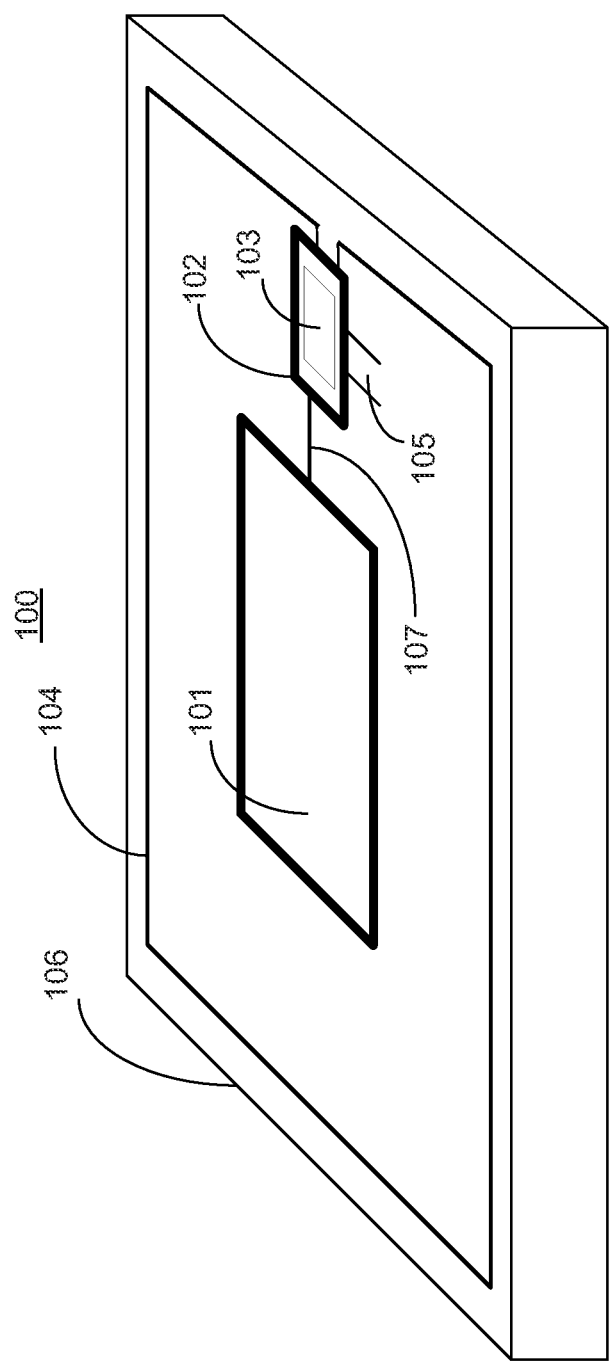
FIG. 1 illustrates a high level diagram of a multi-chip package comprising a processor and a radio-frequency identity (RFID) tag having an attribute identity associated with group of processors, according to one embodiment of the invention.

Embodiments of the invention relate to an apparatus, system, and methods for providing attribute identity control associated with a processor, in one embodiment, the attribute identity is stored in a radio frequency identity (RFID) tag which is coupled to a processor. In one embodiment, the attribute identity associated with a group of processors is protected by cryptography and is accessible by a key. In one embodiment, the attribute identity is visible (for reading) by a software module executing on the processor only after the attribute identity is authenticated by the processor. In one embodiment, the processor is operable to take one or more countermeasure steps when the authentication process indicates that the attribute identity is invalid or tampered with. In one embodiment, the countermeasures include aborting a booting process, sending a message to another computer that the attribute identity has been tampered with, locking internet access to the processor system, locking internet access to the processor.

While the embodiments herein discuss the attribute identity with reference to a group of processors, the attribute identity concept as discussed in various embodiments herein is also applicable to a group or class of computer platforms. The term "attribute identity" herein is also referred to as "attribute identity data."

In one embodiment, the attribute identity includes business proprietary information. In other embodiments, other information may be added to form the attribute identity of a group of processors. By provisioning the attribute identity of a group of processors on a RFID tag, as opposed to just the specific entity identity of the processor, business proprietary information is safeguarded from any leakage from the processor to the external world.

In one embodiment, the business proprietary information is manufacturing and/or shipment data information form specific Original Equipment Manufacturer (OEM) for a group of processors. The data of the attribute identity does not contain any uniquely identifiable information related to a specific processor or a specific computer platform having the processor. Instead, the data of the attribute identity contains information common to a group of processors and/or a group or class of computer platforms. This data of the attribute identity is readable by host software (also referred to herein as the software module). By including such high level business proprietary information as attribute identity for a group of processors and/or a group or class of computer platforms, personal user information associated with any processor from the group of processors cannot be used to harm the user because the information extra led (i.e., the attribute identity) is associated with a group of processors (and/or a group or class of computer platforms) and not unique to a single processor (and/or a single computer platform).

In one embodiment, illegal software licensing for a processor is identified when the attribute identity is tampered with to cause execution of a particular software, which otherwise would not be allowed to be executed for that processor due to licensing agreements. In one embodiment, the attribute identity holds warranty information associated with a group of processors for a particular OEM.

In one embodiment, by storing the attribute identity in the RFID tag, external devices may be used to store and read the attribute identity without having to power on the processor. In one embodiment, the external device is an RFID gun which is operable to store/program and/or read the attribute identity of the processor.

In the following description, numerous details are discussed to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Figure 3:
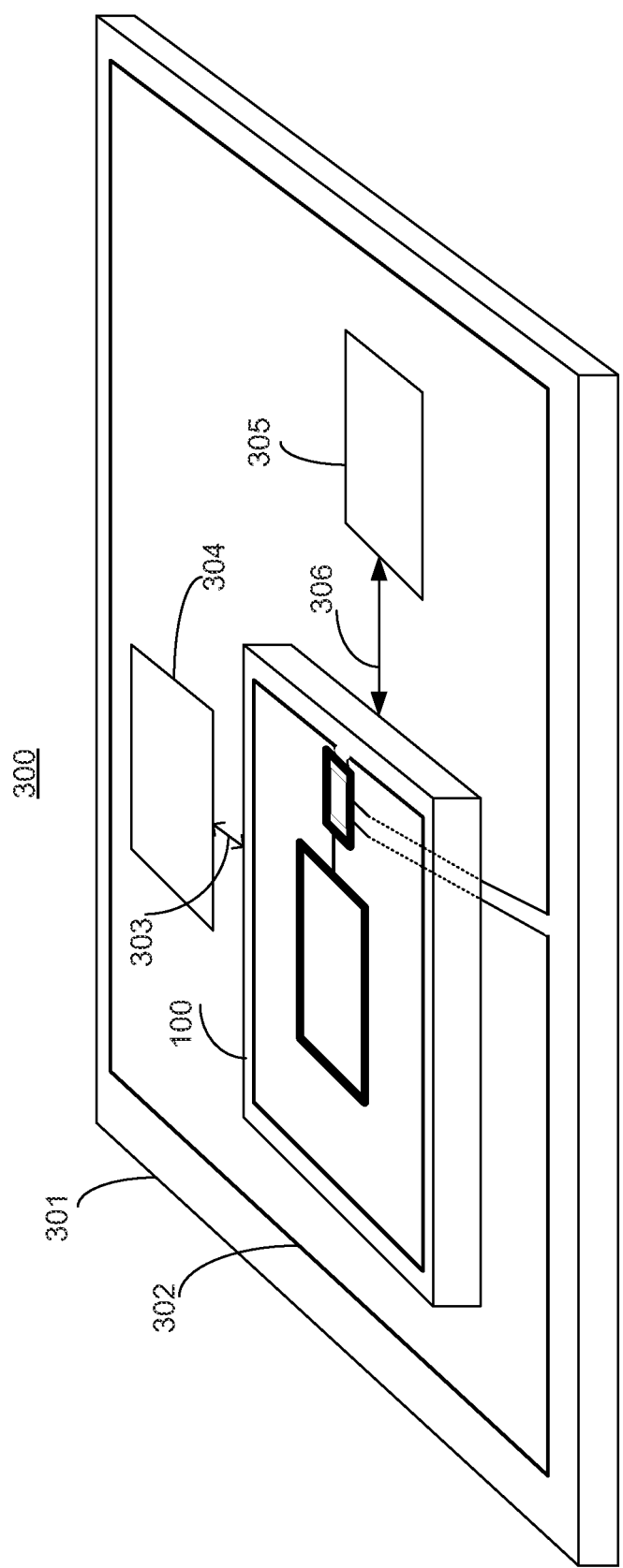
FIG. 3 is a computer platform with an antenna to communicate with the RFID tag, according to one embodiment of the invention.

FIG. 1 illustrates a high level diagram of a multi-chip package 100 comprising a processor 101 and a RFID tag 102 having an attribute identity associated with a group of processors, according to one embodiment of the invention. In one embodiment, the RFID tag 102 is disposed on a mounting substrate 106. In one embodiment, the RFID tag 102 is formed in a semi-conductive substrate. In one embodiment, the RFID tag 102 uses an antenna 104. In one embodiment, the antenna 104 is a copper loop. In one embodiment, the antenna 104 is a dipole antenna. In other embodiments, other forms of antenna (e.g., folded dipoles, end-fire antennas, coplanar waveguide antennas, patch antennas, etc) may be used for the antenna 104. In one embodiment, the RFID tag 102 comprises another antenna interface 105 for coupling to another antenna 302 on a motherboard as shown in FIG. 3.

Referring back to FIG. 1, in one embodiment the antenna 104 is positioned in the substrate 106. In one embodiment, the antenna 104 is positioned on a chassis where the substrate 106 is a component package coupled to a larger substrate (301 of FIG. 3). Referring back to FIG. 1, in one embodiment the RFID tag 102 is coupled to the processor 101 by an input-output (I/O) interconnect 107. In one embodiment, the I/O interconnect 107 is a point-to-point bus. In another embodiment, the I/O interconnect 107 is a serial bus. In one embodiment, the I/O interconnect 107 is a Serial Advanced Technology Attachment (SATA) based link. In one embodiment, the serial bus is an I$^2$C serial bus. In one embodiment, the data on the interconnect 107 is encrypted.

In one embodiment, the communication on the interconnect 107 is protected by cryptography. In one embodiment, the cryptography is symmetric cryptography. In one embodiment, the symmetric cryptography is Advanced Encryption Standard (AES) which uses shared keys. In one embodiment, the cryptography is asymmetric cryptography. In one embodiment, asymmetric cryptography is one of Rivest-Shamir-Adleman (RSA) based cryptography or elliptic curve digital signature algorithm (ECDSA) based cryptography.

In one embodiment, any suitable interconnect may be used to communicate between the RFID tag 102 and the processor 101. In one embodiment, the processor 101 is a microprocessor designed and manufactured by INTEL® CORPORATION of Santa Clara, Calif. in other embodiments, other processors by other vendors may be used without changing the essence of the embodiments of the invention.

In one embodiment, the RFID tag 102 comprises a non-volatile random-access memory (NVRAM) 103. In one embodiment, the NVRAM is a solid-state drive (SSD). In one embodiment the NVRAM 103 is a NAND flash memory. In one embodiment the NVRAM 103 is a NOR flash memory. In other embodiments, other types of non-volatile memories may be used in the RFID tag 102. In one embodiment, the attribute identity associated with a group of processors is stored in the NVRAM 103. As mentioned above, in one embodiment the attribute identity includes business proprietary information. In other embodiments, other common/shared information may be added to form the attribute identity of a group of processors. By provisioning the attribute identity of a group of processors (and/or a group of computer platforms) on an RFID tag, as opposed to just the specific entity identity of the processor (or computer platform), business proprietary information is safeguarded from any leakage from the processor to the external world. In one embodiment, the attribute entity is protected by cryptography as discussed above.

In one embodiment, the processor 101 and the RFID 102 reside in a multi-chip package. In one embodiment, the RFID 102 and its NVRAM 103 are integrated within the processor 101 i.e., in a single silicon die. In one embodiment, the RFID tag 102 is a passive RFID tag 102. The term "passive" herein refers to the absence of a battery to power the RFID tag 102.

Figure 2:
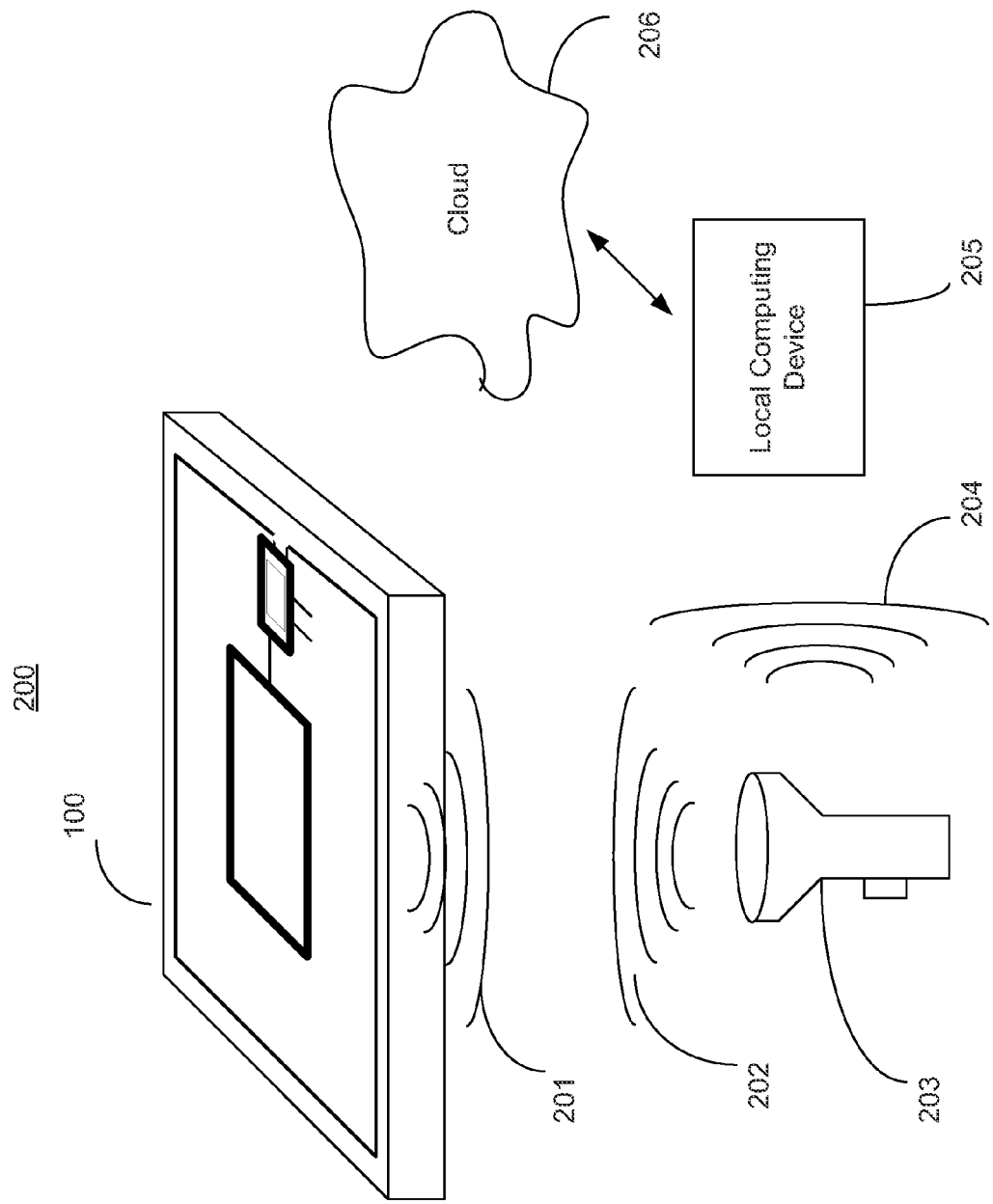
FIG. 2 is a high level computer system with the multi-chip package comprising the processor and the RFID tag having the attribute identity associated with the group of processors, according to one embodiment of the invention.

FIG. 2 is a high level computer system 200 with the multi-chip package 100 comprising the processor 101 and the RFID tag 102 having the attribute identity associated with the group of processors, according to one embodiment of the invention. FIG. 2 is described with reference to FIG. 1. In one embodiment, a source 203 is used to program the attribute identity in the RFID tag 102, associated with a group of processors, to one or more processors of the group of processors. The term "programming" herein refers to modifying and/or storing a value to at least one field of the attribute identity.

In one embodiment, the source 203 is external to the multi-chip package 100. In one embodiment, the source 203 is an RFID gun. In one embodiment, the source 203 comprises one or more columns of radiating elements to program a large number of RFID tags in a group of processors. In one embodiment, the source 203 is operable to program the RFID tag 102 by transmitting an RF signal 202 to the RFID tag 102. In one embodiment, source 203 is operable to receive the attribute identity from the RFID tag 102 by receiving an RF signal 201 from the RFID tag 102. In one embodiment, source 203 is also operable to communicate with a computing device 205 by means of signals 204. In one embodiment, the computing device 205 is coupled to a cloud 206 to communicate with multiple devices.

In one embodiment, a remote user initiates programming of the attribute identity from the cloud 206 via the computing device 205 and the source 203. In an alternative embodiment, a local user initiates programming of the attribute identity via the computing device 205. In one embodiment, the source 203 is integrated in the computing device 205. In one embodiment, the attribute identity is set for a group of processors (and/or a group of computer platforms) so that a group of processors (and/or a group of computer platforms) is associated with a particular OEM and software licenses. In one embodiment, the computing device 205 computes a pairs of key (public/private pair of keys) associated with the attribute identity.

The term "public/private keys" herein describe a set of cryptographic keys used for public-key cryptography. The key pair comprises a "public key" and a "private key." The term "public key" herein is used to refer to the public half of a key pair. The term "private key" herein is used to refer to the private or secret half of the key pair.

In one embodiment, the key pair is used to encrypt the attribute identity data. In one embodiment, the public key of the key pair is used for encrypting the attribute identity data while the private key of the key pair is used for decrypting the attribute identity data.

In one embodiment, the key pair is used to generate a digital signature associated with the attribute identity. In one embodiment, the private key of the key is used for signing a message (i.e., attribute identity) and the public key of the key is used for verifying the message (i.e., the attribute identity).

In one embodiment, the public key of the key pair is used to encrypt the attribute identity data to ensure that the encrypted attribute identity is only decrypted by an entity (e.g., the source 203, the computing device 205, etc) holding the corresponding private key of the key pair. In one embodiment, the public key of the key pair is used to verify the digital signature created by the entity holding the private key.

In one embodiment, the computing device 205 transmits the key associated with the encrypted attribute identity to the processor 101 and the RFID tag 102. In one embodiment, the computing device 205 also includes the key so that it may decode the encrypted attribute identity from the RFID tag 102. In one embodiment, the processor 101 generates the key, associated with the attribute identity, which is transmitted via the interconnect 107 to the RFID tag 102. In one embodiment, the source 203 is operable to read the attribute identity from the NVRAM 103 and to transmit the read value to the computing device 205 which further determines whether the attribute identity has been tampered with.

In one embodiment, the source 203 and the computing device 205 are integrated on a single device. In one embodiment, the source 203 is operable to communicate with the computing device 205 by means of a physical link (not shown).

FIG. 3 is a computer platform 300 with another antenna 302 (also referred to as the second antenna) to communicate with the RFID tag 102, according to one embodiment of the invention. FIG. 3 is described with reference to FIGS. 1-2. In one embodiment, the computer platform 300 comprises the processor 101 which is coupled to a chipset 305 via a bus 306. In one embodiment, the chipset is a processor designed and manufactured by INTEL® CORPORATION of Santa Clara, Calif. In one embodiment, the computer platform 300 is coupled to a memory module 304 via a bus 303. In one embodiment, the memory module 304 is a dual-inline memory module (DIMM). In one embodiment, the bus 303 is a Double Data Rate 4 (DDR4) interface. In other embodiments, other types of memory modules 304 and bus 303 may be used.

In one embodiment, the antenna interface 105 is connected to the other antenna 302. In one embodiment the antenna 302 is positioned in the substrate 301. In one embodiment, the other antenna 302 is configured to provide and receive far field radiation for access to the RFID tag 102 by wireless devices away from the computer platform 300. In one embodiment, the other antenna 302 is configured to provide and receive far field radiation for access to the RFID tag 102 by other integrated circuits on the computer platform 300.

In one embodiment, the other antenna 302 is a copper loop. In one embodiment, the other antenna 302 is a dipole antenna. In other embodiments, other forms of antenna (e.g., folded dipoles, end-lire antennas, coplanar waveguide antennas, patch antennas, etc) may be used for the antenna 302.

In one embodiment, the processor 101 performs integrity and authenticity checks of the attribute identity stored in the NVRAM 103 each time the computer platform 300 boots. In one embodiment, the processor 101 is operable to validate and authenticate the attribute identity (i.e., perform integrity and authenticity checks) when the NVRAM 103 is accessed by any entity (e.g., chipset 305, memory module 304, other computer platforms). In one embodiment, the processor 101 is operable to validate and authenticate the attribute identity (i.e., perform integrity and authenticity checks) only when the data in the NVRAM 103 is accessed.

The term "authenticate and/or validate" herein is used with reference to verifying the digital signature of the attribute identity, decrypting the encrypted attribute identity using the pair of keys, or any other means for validating the contents of the attribute identity.

Figure 4:
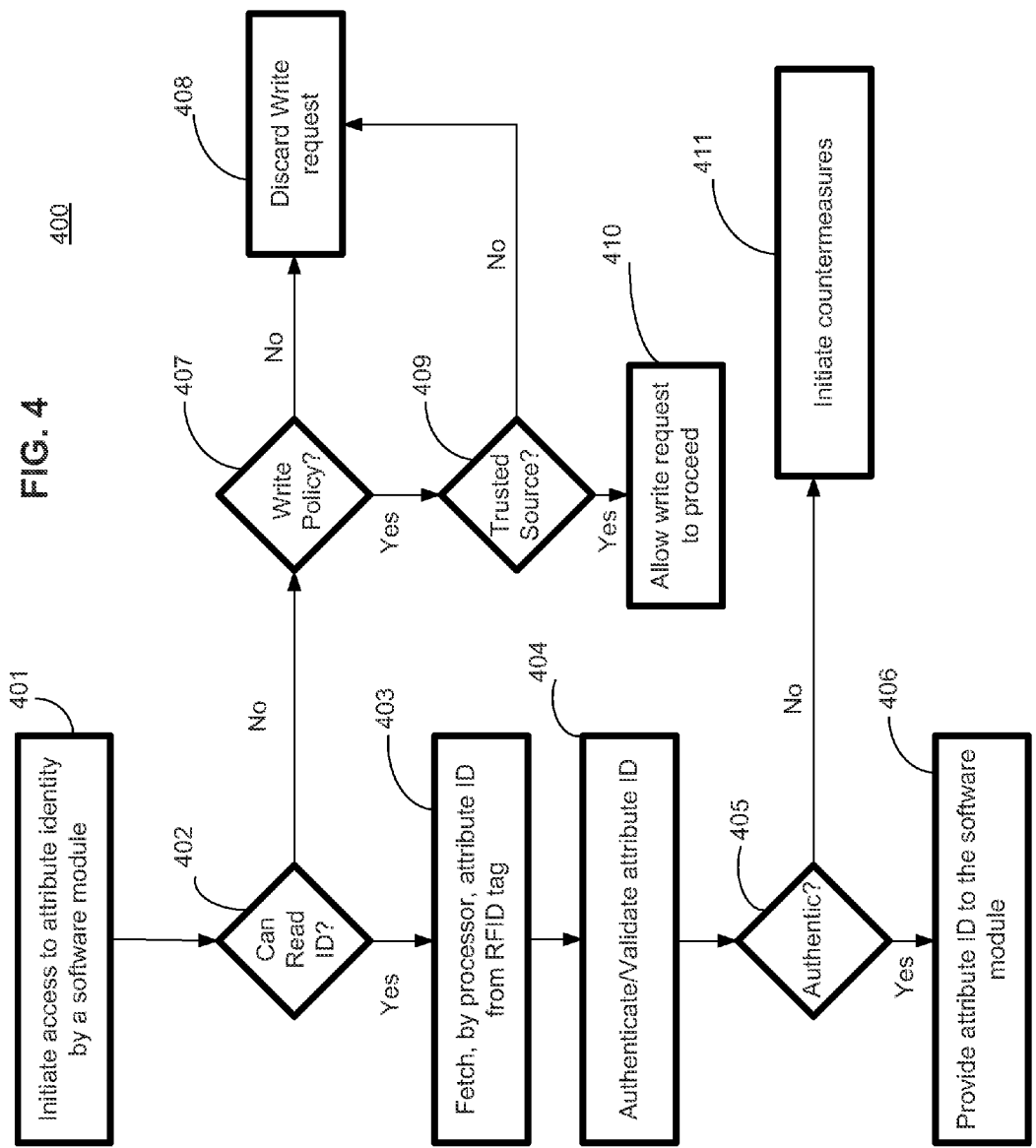
FIG. 4 is a method flowchart of programming and authenticating the attribute identity stored in a non-volatile memory of an RFID tag, according to one embodiment of the invention.

FIG. 4 is a method flowchart 400 of programming and authenticating the attribute identity stored in the NVRAM 103 of the RFID tag 102, according to one embodiment of the invention. The flowchart is discussed with reference to FIGS. 1-3. Although the blocks in the flowchart 400 are shown in a particular order, the order of the actions can be modified. Thus, the illustrated embodiments can be performed in a different order, and some actions/blocks may be performed in parallel. Additionally, one or more actions/blocks can be omitted in various embodiments of programming and authenticating the attribute identity stored in the NVRAM 103 of the RFID tag 102.

At block 401, a software module initiates access to the attribute identity to ascertain the authenticity of the processor 101. One reason to authenticate the processor 101 is to determine whether a license granted to execute a software program on the processor 101 is being used legally i.e., the license is not being used for a processor not authorized to execute the software program. In one embodiment, an entity (other than the software module) initiates access to the attribute identity to ascertain the authenticity the processor 101. In one embodiment, prior to block 401, a key pair is computed/generated and stored in the processor 101 and the NVRAM 103 of the RFID tag 102. In one embodiment, the key pair is a shared key pair. In one embodiment, the shared key pair is also stored in the source 203 (e.g., RFID gun) and the computing device 205. In one embodiment, the key pair is stored in the source 203 (e.g., RFID gun) and the computing device 205.

At block 402, a determination is made whether the software module (or the entity initiating the access) is authorized to read the attribute identity from the NVRAM 103 of the RFID tag 102. If a determination is made that the software module (or the entity initiating the access in block 401) is authorized to read data from the NVRAM 103, then the process proceeds to block 403.

At block 403, the processor 101 fetches the attribute identity from the RFID tag 102 via the interconnect 107. At block 404, the processor 101 then authenticates/validates the attribute identity to ascertain whether the attribute identity has been tampered with by any entity. At block 405, a determination is made whether the attribute identity is authentic. If a determination is made that the attribute identity stored in the NVRAM 103 is authentic (i.e., not tampered with) then at block 406 the attribute identity is made visible to the software module (of the entity initiating the access in block 401). At block 405, if a determination is made that the attribute identity is not in its original form when it was stored with the shared key in the NVRAM 103, then at block 411 the processor 101 initiates countermeasures.

In one embodiment, the countermeasures include aborting a boot process, enabling an alarm in the computer platform 300, locking the computer platform 300 from further computations, denying access privileges to various components on the computer platform, disabling the internee connectivity of the platform 300, sending a message (e.g., via email) to the OEM that the attribute identity provided by the manufacture has been tampered with, sending a message (e.g., via email) to the manufacturer that at least a processor belonging the group of processors having the same attribute identity has been tampered with.

In one embodiment, if a determination made at block 402 is that the software module (or the entity initiating access at block 401) is not authorized to read the attribute identity from the NVRAM 103, then at block 407 a determination is made whether any write policy exists. In one embodiment, the write policy is available/stored on the processor 101 or any other processor/memory (not shown). The write policy outlines which entity can write to the NVRAM 103 to change/modify the attribute identity. In one embodiment, entities which are authorized to modify the attribute identity also have access to the same key (or shared key) which was provisioned by the manufacture prior to block 401. As discussed above, keys are used to encrypt/decrypt the attribute identity data and/or to generate and verify digital signature associated with the attribute identity data.

In one embodiment, if a determination is made that a write policy does not exist then at block 407 any write request initiated by the software module (or the entity initiating access at block 401) is discarded by the processor 101.

In one embodiment, if a determination is made that a write policy exists then at block 409 a determination is made whether the software module (or the entity initiating access at block 401) is a trusted source. At block 409, if a determination is made that the software module (or the entity initiating access at block 401) is not a trusted source then the method process returns to block 408 and any write request initiated by the software module (or the entity initiating access at block 401) is discarded by the processor 101. At block 409, if a determination is made that the software module (or the entity initiating access at block 401) is trusted source then at block 410 the software module (or the entity initiating access at block 401) is allowed to write to the NVRAM 103.

Figure 5:
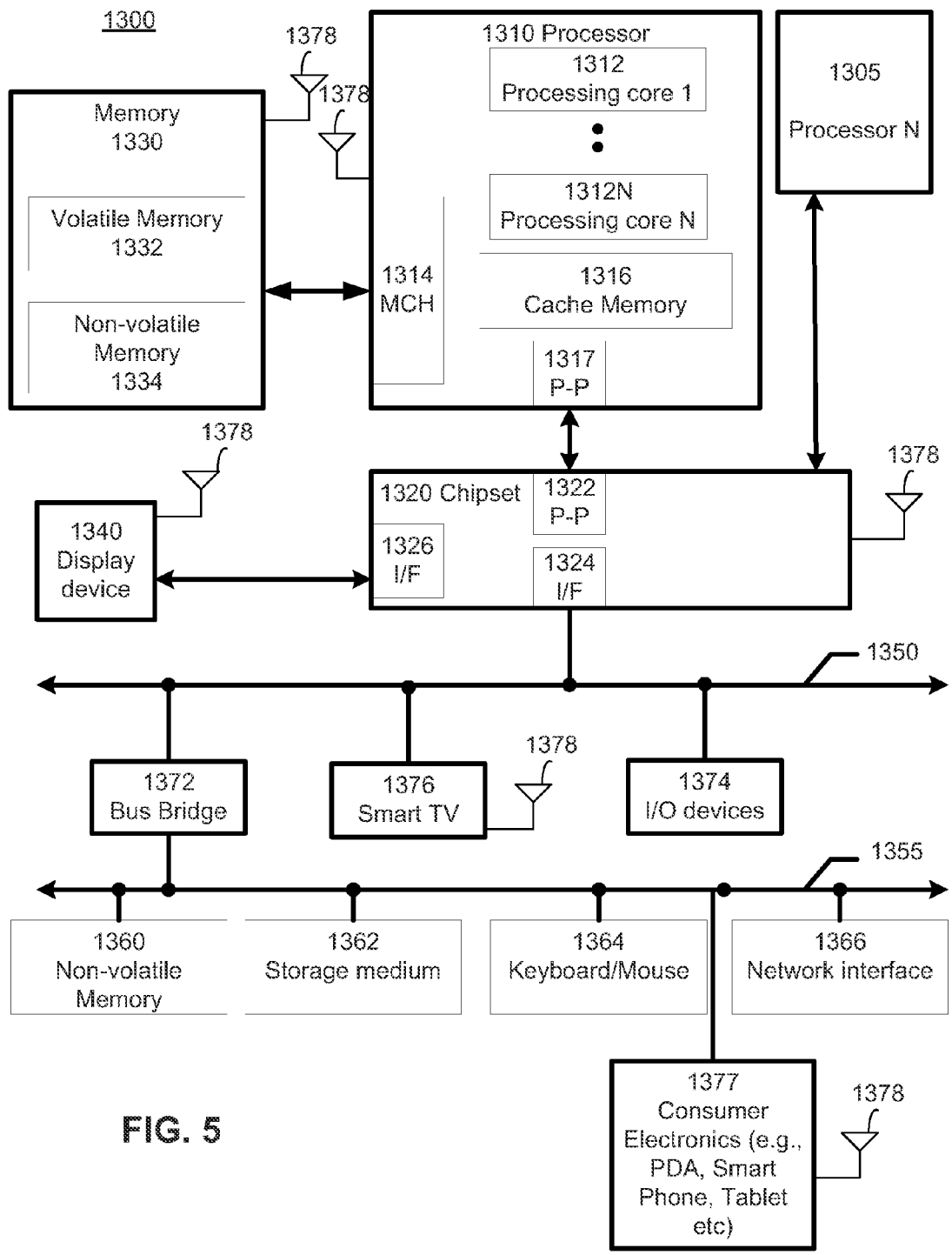
FIG. 5 illustrates a system level diagram comprising the processor and the RFID tag having the attribute identity associated with the group of processors, according to one embodiment of the invention.

FIG. 5 illustrates a system level diagram having the multi-chip package comprising the processor and the RFID tag having the attribute identity associated with the group of processors, according to one embodiment of the invention. FIG. 5 also includes a machine-readable storage medium to execute computer readable instructions to perform the methods of various embodiments. Elements of embodiments are also provided as a machine-readable medium (e.g., 1362) for storing the computer-executable instructions (e.g., instructions to implement the flowchart of FIG. 4). The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic or computer-executable instructions. For example, embodiments of the invention may be downloaded as a computer program (e.g., BIOS) which may be transferred from a remote computer (e.g., a server) to a requesting computer (e.g., a client) by way of data signals via a communication link (e.g., a modem or network connection).

In one embodiment, the system 1300 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, the system 1300 implements the methods disclosed herein and may be a system on a chip (SOC) system.

In one embodiment, the processor 1310 (same as 100 of FIG. 1) has one or more processing cores 1312 and 1312N, where 1312N represents the Nth processor core inside the processor 1310 where N is a positive integer. In one embodiment, the system 1300 includes multiple processors including processors 1310 and 1305, where processor 1305 has logic similar or identical to logic of processor 1310. In one embodiment, the system 1300 includes multiple processors including processors 1310 and 1305 such that processor 1305 has logic that is completely independent from the logic of processor 1310. In such an embodiment, a multi-package system 1300 is a heterogeneous multi-package system because the processors 1305 and 1310 have different logic units. In one embodiment, the processing core 1312 includes, but is not limited to, pre-fetch logic to fetch instructions, decode logic to decode the instructions, execution logic to execute instructions and the like. In one embodiment, the processor 1310 has a cache memory 1316 to cache instructions and/or data of the system 1300. In another embodiment of the invention, the cache memory 1316 includes level one, level two and level three, cache memory, or any other configuration of the cache memory within the processor 1310.

In one embodiment, processor 1310 includes a memory control hub (MCH) 1314, which is operable to perform functions that enable the processor 1310 to access and communicate with a memory 1330 that includes a volatile memory 1332 and/or a non-volatile memory 1334.

In one embodiment, the processor 1310 is operable to communicate with the memory 1330 and a chipset 1320. In one embodiment, the processor 1310 is also coupled to a wireless antenna 1378 to communicate with any device configured to transmit and/or receive wireless signals. In one embodiment, the wireless antenna interface 1378 operates in accordance with, but is not limited to, the IEEE 802.11 standard and its related family, HomePlug AV (HPAV), Ultra Wide Band (UWB), Bluetooth, WiMAX, or any form of wireless communication protocol.

In one embodiment, the volatile memory 1332 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1334 includes, but is not limited to, flash memory, phase change memory (PCM), read-only memory (ROM), electrically erasable programmable read-only memory (EEPROM), or any other type of non-volatile memory device.

The memory 1330 stores information and instructions to be executed by the processor 1310. In one embodiment, memory 1330 may also store temporary variables or other intermediate information while the processor 1310 is executing instructions. In one embodiment, chipset 1320 connects with processor 1310 via Point-to-Point (PtP or P-P) interfaces 1317 and 1322. In one embodiment, chipset 1320 enables processor 1310 to connect to other modules in the system 1300. In one embodiment of the invention, interfaces 1317 and 1322 operate in accordance with a PtP communication protocol such as the INTEL® QuickPath Interconnect (QPI) or the like.

In one embodiment, the chipset 1320 is operable to communicate with the processor 1310, 1305, display device 1340, and other devices 1372, 1376, 1374, 1360, 1362, 1364, 1366, 1377, etc. In one embodiment, the chipset 1320 is also coupled to a wireless antenna 1378 to communicate with any device configured to transmit and/or receive wireless signals.

In one embodiment, chipset 1320 connects to a display device 1340 via an interface 1326. In one embodiment, the display 1340 includes, but is not limited to, liquid crystal display (LCD), plasma, cathode ray tube (CRT) display, or any other form of visual display device. In one embodiment of the invention, processor 1310 and chipset 1320 are merged into a single SOC. In addition, the chipset 1320 connects to one or more buses 1350 and 1355 that interconnect various modules 1374, 1360, 1362, 1364, and 1366. In one embodiment, buses 1350 and 1355 may be interconnected together via a bus bridge 1372 if there is a mismatch in bus speed or communication protocol. In one embodiment, chipset 1320 couples with, but is not limited to, a non-volatile memory 1360, a mass storage device(s) 1362, a keyboard/mouse 1364, and a network interface 1366 via interface 1324, smart TV 1376, consumer electronics 1377, etc.

In one embodiment, the mass storage device 1362 includes, but is not limited to, a solid state drive, a hard disk drive, a universal serial bus flash memory drive, or any other form of computer data storage medium. In one embodiment, network interface 1366 is implemented by any type of well known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, HomePlug AV (HPAV), Ultra Wide Band (UWB), Bluetooth, WiMAX, or any form of wireless communication protocol.

While the modules shown in FIG. 5 are depicted as separate blocks within the system 1300, the functions performed by some of these blocks may be integrated within a single semiconductor circuit or may be implemented using two or more separate integrated circuits. For example, although the cache memory 1316 is depicted as a separate block within the processor 1310, the cache memory 1316 can be incorporated into the processor core 1312 respectively. In one embodiment, the system 1300 may include more than one (processor/processing core in another embodiment of the invention.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements, if the specification or claims refer to "an additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description. The embodiments of the invention are intended to embrace all such alternatives, modifications, and variations as to fall within the broad scope of the appended claims.

We claim:

1. An apparatus comprising:
a processor having a wireless interface operable to access a non-volatile memory of a radio-frequency identification (RFID) tag to store an attribute identity that is correlated with software that is licensed for a group of processors that include the processor rather than being correlated with the software that is licensed for the processor specifically so that licensed software is accessible to the processor without the processor having to uniquely identify itself, and where the attribute identity does not uniquely identify the processor, wherein, the processor is operable to:
determine if a software entity that desires access to the attribute identity is permitted to read from the non volatile memory of the RFID tag;
read the attribute identity from the non-volatile memory of the RFID tag in response to a determination that the software entity is permitted to read the attribute identity from the non volatile memory of the RFID tag;
authenticate the attribute identity;
provide the attribute identity to the software entity in response to the authenticity of the attribute identity being validated, or, initiate countermeasures if the attribute identity is not validated.

2. The apparatus of claim 1, wherein the processor and RFID tag are positioned in a single multi-chip package, and wherein the RFID tag is a passive RFID tag.

3. The apparatus of claim 1, wherein the processor is operable to communicate with the RFID tag via an input-output (I/O) interface, and wherein the communication is protected by cryptography.

4. The apparatus of claim 1, wherein the RFID tag is operable to program the attribute identity by collecting energy, via an antenna, from a source external to the RFID tag to modify the attribute identity.

5. The apparatus of claim 1, wherein the processor is operable to validate the authenticity of the attribute identity when the non-volatile memory is accessed by any entity of the processor.

6. The apparatus of claim 1, wherein the processor is operable to abort a booting process in response to failing to validate the authenticity of the attribute identity.

7. The apparatus of claim 1, wherein the attribute identity is encrypted or digitally signed when stored in the non-volatile memory.

8. The apparatus of claim 7, wherein the processor is operable to store a public key, read the encrypted or digitally signed attribute identity from the non-volatile memory, and verify the attribute identity with the stored public key.

9. A system comprising:
an antenna;
a memory module; and
a processor package comprising:
a processor having a wireless interface operable to access a non-volatile memory of a radio-frequency identification (RFID) tag to store an attribute identity that is correlated with software that is licensed for a group of processors that include the processor rather than being correlated with the software that is licensed for the processor specifically so that licensed software is accessible to the processor without the processor having to uniquely identify itself, and where the attribute identity does not uniquely identify the processor, wherein, the processor is operable to:
determine if a software entity that desires access to the attribute identity is permitted to read from the non volatile memory of the RFID tag;
read the attribute identity from the non-volatile memory of the RFID tag in response to a determination that the software entity is permitted to read the attribute identity from the non volatile memory of the RFID tag;
authenticate the attribute identity;
provide the attribute identity to the software entity in response to the authenticity of the attribute identity being validated, or, initiate
countermeasures if the attribute identity is not validated.

10. The system of claim 9, wherein the processor is operable to communicate with the RFID tag via an input-output (I/O) interface, and wherein the communication is protected by cryptography.

11. The system of claim 9, wherein the processor is operable to validate the authenticity of the attribute identity when the non-volatile memory is accessed by any entity of the processor.

12. The system of claim 9, wherein the processor is operable to abort a booting process in response to failing to validate the authenticity of the attribute identity.

13. A method comprising:
programming a field of an attribute identity in a non-volatile memory of a radio-frequency identification (RFID) tag, wherein the attribute identity is associated with software that has been licensed to a group of processors rather than any processor specifically, the group of processors including a processor, and where the attribute identity does not uniquely identify the processor;
determining by the processor if a software entity that desires access to the attribute identity is permitted to read from the non volatile memory of the RFID tag;
reading the attribute identity from the non-volatile memory of the RFID tag by the processor in response to the processor determining that the software entity is permitted to read the attribute identity from the non volatile memory of the RFID tag;
the processor authenticating the attribute identity;
the processor providing the attribute identity to the software entity in response to the authenticity of the attribute identity being validated so that licensed software for the processor is able to be executed by the processor without the processor having to uniquely identify itself, or, the processor initiating countermeasures if the attribute identity is not validated.

14. The method of claim 13, wherein programming the field of the attribute identity comprises collecting energy from a source to modify a value of the field of the attribute identity.

15. The method of claim 13, wherein authenticating the attribute identity comprises:
encrypting or digitally signing the attribute identity stored in the non-volatile memory;
storing a shared public key;
reading the encrypted or digitally signed attribute identity from the non-volatile memory; and
verifying the attribute identity with the stored shared public key.

* * * * *